Nov. 4, 1952
T. W. PRATT
2,616,830
REFINING OF PETROLATUM
Filed Feb. 20, 1948
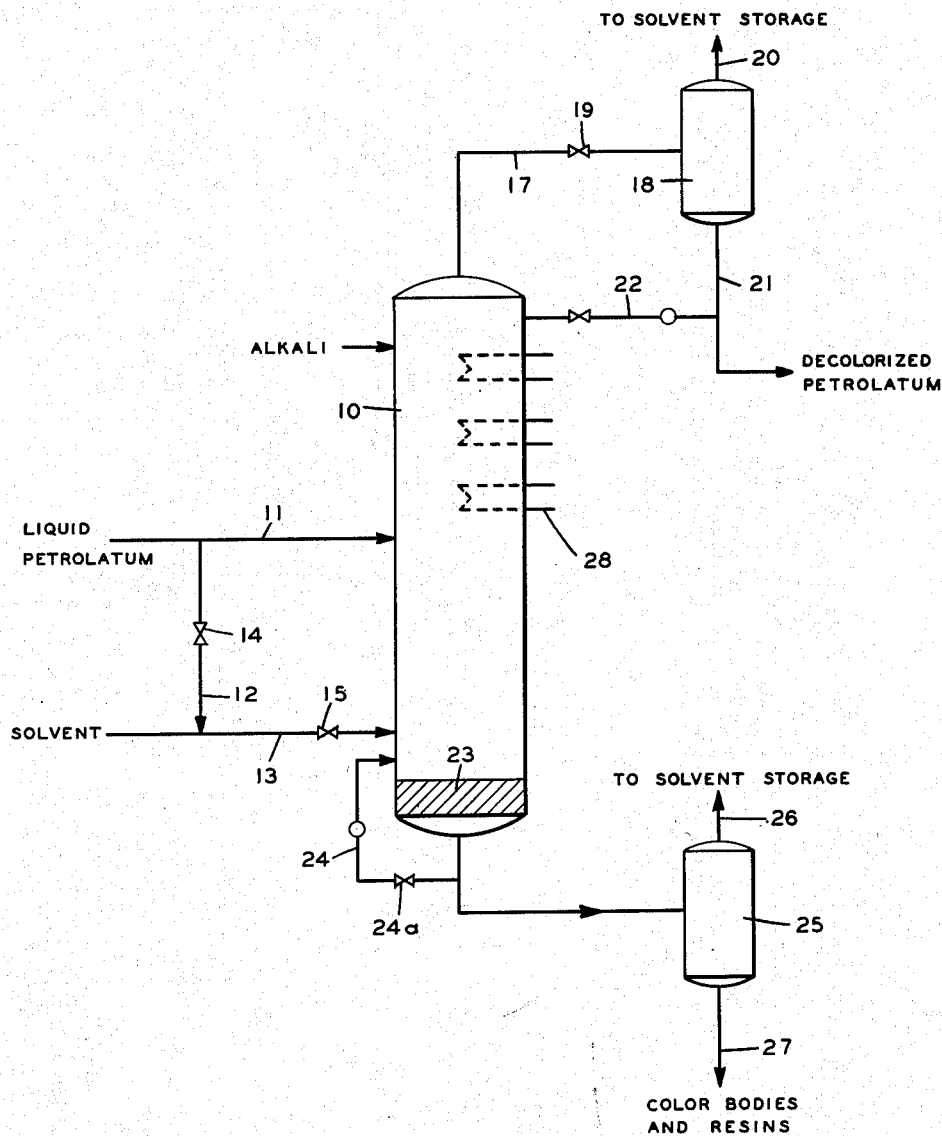
INVENTOR
THOMAS W. PRATT
BY E. F. Liebrecht
Edmond F. Shanahan
ATTORNEYS Patented Nov. 4, 1952

2,616,830

UNITED STATES PATENT OFFICE 2,616,830

REFINING OF PETROLATUM

Thomas W. Pratt, Rutherford, N. J., assignor to The M. W. Kellogg Co., Jersey City, N. J., a corporation of Delaware Application February 20, 1948, Serial No. 9,672

3 Claims. (Cl. 196—21)

This invention relates in general to the refining of petrolatum and more particularly to the decolorizing of petrolatum by treatment with an alcohol such as isopropyl or isobutyl alcohol in the presence of an alkali. The term "petrolatum" is used herein to include all micro-crystalline waxes, that is, all residual waxes which require decolorizing or deresining. The crystalline or paraffin waxes usually do not require decolorizing and usually do not contain resins.

A number of new uses have greatly increased the importance of micro-crystalline waxes in the manufacture of vapor and moisture proof wrapping papers. Because of their high melting point, micro-crystalline waxes do not soften, run, or stick at tropical temperatures. Paraffin waxes also have this virtue but at low temperatures the micro-crystalline waxes retain a flexibility required on paper wrappings, whereas paraffin coatings tend to crack and flake off at temperatures near zero degrees Fahrenheit. It is important in the manufacture of such wrapping that the wax coating be white or transparent and not have a dark or dirty appearance. Most previous refining methods have produced a petrolatum with a color of 6 to 7 on a National Petroleum Associates scale. This color is described as "dark red" or "claret red," but it actually has a dark brown color when used in opaque thickness. It is a major object of the process herein disclosed to produce a wax which is creamy white or pale lemon color. The process herein disclosed has been successful in producing waxes with a color of 1½–2½ on the National Petroleum Associates scale.

In order to improve petrolatum for high grade commercial use, it is necessary to remove color bodies and resin content. In the past, this has generally been accomplished by distillation, a process which proves expensive because of the heat consumed, the high vacuum required, and the losses in the product. It is the major object of the present invention to provide a more efficient and economical method for refining petrolatum.

It is another major object of the invention to decolorize petrolatum satisfactorily without excessive heating.

These and other objects are accomplished by subjecting the crude petrolatum to solvent fractionation with alcohol. It has been found that if petrolatum is dissolved in boiling alcohol, preferably isopropyl or isobutyl, the solution cooled to about 175° F., and an alkali added, a precipitation of a highly colored oily fraction is effected. If this precipitate is separated and the solution cooled, a white petrolatum is recovered.

In the drawing is shown a simplified diagram of an apparatus suitable for practicing a method of the invention in a continuous counter-current extraction tower, which is indicated by the numeral 10. Liquid petrolatum is pumped into the tower through line 11. If desired, alcohol may be added to the liquid petrolatum through line 12 before introduction into the tower. An alternative method of operation is to supply all or part of the solvent directly to the tower through line 13, valves 14 and 15 being provided for control of the solvent flow. At a point substantially above lines 11 and 13, an alkaline solution, usually an aqueous solution of sodium hydroxide or ammonia, is introduced into tower 10 through line 16 and flows downwardly through the tower, causing a separation to occur in the solution of petrolatum in alcohol. An oily lower phase which is very dark in color is precipitated in the lower part of tower 10.

The greater part of the petrolatum is dissolved in the alcohol to form a light upper phase which moves upwardly through the tower and is withdrawn from the upper end through line 17 and transmitted to tank 18 in which the alcohol is separated from the refined petrolatum, by any convenient means, for instance, by steam stripping. Also, separation of the alcohol may be aided by flashing the extract phase to lower pressure within tank 18 through valve 19. The vaporized alcohol is withdrawn from tank 18 through line 20 and is condensed, recompressed, and cooled by means not shown for reuse in solvent extraction tower 10. The refined petrolatum, substantially free of alcohol is removed from tank 18 through line 21, a portion of it being recycled to tower 10 through line 22 if it is desired to control the solvent extraction process by refluxing.

Ordinarily it is necessary to remove only about 2% of the petrolatum to produce a decolorized and refined product. Under some conditions, a better separation of color bodies and other impurities may be achieved by withdrawing a substantially larger fraction of the petrolatum in the bottom phase and by recycling a part of this withdrawn material to tower 10 at a point above the interface 23 between two phases. A bottoms recycling line 24 and valve 24a may be employed for this purpose.

The balance of the bottoms is heated in a tank 25 to drive off the alcohol through line 26 and permit the withdrawal of the raffinate product containing resins and color bodies through line 27. The recovered alcohol is liquefied and recycled for reuse in the solvent fractionation process.

To insure the precipitation of all resins and color bodies, it is a preferred method of operation to operate tower 10 with a temperature gradient therein such that the temperature decreases with elevation. Coils 28 are provided for this purpose. These coils may be either heating or cooling coils depending on whether the temperatures of the incoming liquids are above or below that desired within the tower. In either case, the coils 28 are used to establish a lower temperature in the upper part of the tower and a relatively higher temperature further down. Thus, as the extract phase moves upwardly through the tower, it is cooled and some components of the dissolved petrolatum are precipitated. In this way, resins and color bodies are more precisely separated from the petrolatum.

In effect there are two solvents present in the extraction system. The alcohol is a solvent for the petrolatum and the alkali is a solvent for the resins, so that in a sense both upper and lower phases are extracts. However, the alkali solvent is present in a quantity which is very small relative to the amount of alcohol and the upper and lower phases closely resemble extract and raffinate phases respectively.

Although the invention has been described with a counter-current extraction process it is, of course, not limited to counter-current extraction alone. The method of the invention may be employed in a batch type process or continuously in a tank process without counter-current extraction.

Although isopropyl or isobutyl alcohol are preferred solvents, most other alcohols will be found suitable for employment in the process if they boil in the neighborhood of the petrolatum melting point or higher.

I claim:

1. A method for continuously separating resinous color bodies from micro-crystalline petrolatum, which includes the steps of: dissolving said petrolatum in an alcohol solvent at a temperature near the normal boiling point of said solvent, said alcohol having a boiling point near the petrolatum melting point or higher; flowing said solution upwardly through a vertically extended contacting zone; cooling said solution as it flows upwardly through said zone; flowing an aqueous alkali solution downwardly through said contacting zone in counter-current relationship with said upflowing alcohol-petrolatum solution to dissolve color bodies from said upflowing phase into a downflowing phase; continuously withdrawing said upper and lower phases from the upper and lower regions of said contacting zone respectively; and recovering decolorized petrolatum from said upper phase.

2. A method for continuously separating resinous color bodies from micro-crystalline petrolatum, which includes the steps of: dissolving said petrolatum in an alcohol solvent at a temperature near the normal boiling point of said solvent, said alcohol having a boiling point near the petrolatum melting point or higher; flowing said solution upwardly through a vertically extended contacting zone; cooling said solution as it flows upwardly through said zone; flowing an aqueous alkali solution downwardly through said contacting zone in counter-current relationship with said upflowing alcohol-petrolatum solution to dissolve color bodies from said upflowing phase into a downflowing phase; accumulating downflowing phase in the lower part of said contacting zone, maintaining an interface between said upflowing and downflowing phases; continuously withdrawing downflowing phase from said accumulation in the lower region of said contacting zone and returning at least part of said withdrawn phase to said contacting zone at a point above the interface level between said phases; withdrawing said upper phase from the upper region of said contacting zone and recovering decolorized petrolatum from said upper phase.

3. A method for continuously separating resinous color bodies from micro-crystalline petrolatum, which includes the steps of: dissolving said petrolatum in isopropyl alcohol at a temperature near the normal boiling point of said alcohol; flowing said solution upwardly through a vertically extended contacting zone; cooling said solution to a temperature between 160° and 190° as it flows upwardly through said zone; flowing an aqueous alkali solution downwardly through said contacting zone in counter-current relationship with said upflowing alcohol-petrolatum solution to dissolve color bodies from said upflowing phase into a downflowing phase; continuously withdrawing said upper and lower phases from the upper and lower regions of said contacting zone respectively; and recovering decolorized petrolatum from said upper phase.

THOMAS W. PRATT.

REFERENCES CITED

The following references are of record in the file of this patent:

UNITED STATES PATENTS

| Number | Name | Date |
|---|---|---|
| 1,672,621 | Nellor et al. | June 5, 1928 |
| 1,796,621 | Ramage | Mar. 17, 1931 |
| 1,813,327 | Souther et al. | July 7, 1931 |
| 2,041,308 | Tuttle | May 19, 1936 |
| 2,309,651 | McCullough et al. | Feb. 2, 1943 |
| 2,429,727 | Macke et al. | Oct. 28, 1947 |

FOREIGN PATENTS

| Number | Country | Date |
|---|---|---|
| 630,220 | France | Nov. 25, 1927 |
| | (2 pages spec.) | |
| 557,290 | Great Britain | Nov. 15, 1943 |
| | (3 pages spec.) | |

OTHER REFERENCES

"The Chemistry and Technology of Waxes" by Warth (page 224), Reinhold Pub. Co., New York, 1947.